United States Patent Office 2,955,024
Patented Oct. 4, 1960

2,955,024
PROCESS FOR MAKING PURIFIED SILICON FROM SILICON-CONTAINING SUBSTANCES

William E. Smith, Sylvania, Ohio, assignor to Owens-Illinois Glass Company, a corporation of Ohio No Drawing. Filed Mar. 26, 1956, Ser. No. 573,592

7 Claims. (Cl. 23—223.5)

This invention relates to highly purified elemental silicon and, more particularly, to a process for producing pure crystals of elemental silicon from silicon-containing substances.

Silicon, although the central element of the mineral world, does not occur in its free elemental form, but, rather, is combined with other elements such as oxygen and the like in the form of silica and silicates. Commercial silicon which is presently available contains minute amounts or traces of a number of elements, examples of which include iron, aluminum, boron, strontium, chromium, calcium, zirconium, titanium, copper, magnesium, manganese, nickel, vanadium and the like.

While silicon containing these impurities has been considered to be substantially pure for most purposes up to now, the advent of the electronic age and the rapid advancements made in the electronic industry have increased the need for even purer silicon than has been commercially or experimentally feasible up to the present time for use in the manufacture of various electronic components, such as semi-conductors, transistors, silicon rectifiers, solar batteries and similar extremely critical and sensitive devices. Contamination of the silicon by the presence of even minute amounts of impurities is sufficient to materially decrease the efficiency of such components.

It is an object of this invention to reduce the impurity content in silicon.

It is another object of this invention to provide a process for producing highly purified crystals of elemental silicon.

Still another object of this invention is to provide a process for forming silicon crystals of sufficient purity from silicon-containing substances whereby such crystals after further treatment are suitable for use in the production of critical and sensitive electronic components.

A further object of this invention is to provide a process for forming pure silicon crystals from molten silicon-aluminum alloys.

In attaining the objects of this invention one feature resides in mixing molten silicon-containing substances with an excess of pure molten aluminum and removing the silicon crystals which are formed therein after a period of nucleation and growth.

Another feature resides in separating the pure silicon crystals from adhering aluminum impurities by a series of flotation baths whereby crystals of the highest degree of purity are obtained.

Other objects, features and advantages of this invention will become more apparent from the following description.

While a number of silicon-containing compounds may be used as a source for the production of pure silicon crystals, glass is preferred since it comprises approximately one-third by weight of silicon and because of its low melting point. By using such low temperatures, a greater reduction in the impurity content of the elemental silicon crystals is achieved.

Glass of low melting composition (below 1400° C.) examples of which include sodium silicate glass, soda-lime-silica glass and the like is preferred. Glass having a very low concentration of magnesium oxide or ferric oxide may also be utilized providing that it is done with care since ferro-silicon and magnesium silicide, when reacted with acids, release dangerous silicon hydride gases. Borosilicate glass is unsatisfactory for the production of pure silicon because, although the presence of boron seems to catalyze the reaction, the resultant silicon contains significant amounts of boron as an impurity, which boron is virtually impossible to remove.

After the glass is melted, it is reacted with an excess of pure molten aluminum whereby the $SiO_2$ in the glass is reduced to silicon while the aluminum is oxidized to aluminum oxide $Al_2O_3$. This latter product may or may not react with the alkali in the glass to form sodium and/or calcium aluminates.

As quickly as the elemental silicon is formed in the molten mass, it dissolves in the excess aluminum to form an alloy in the molten state. This process may be carried out with a low aluminum-to-silicon ratio which is achieved by using equal parts by weight of glass and aluminum. While good results have been achieved with an eutectic melt of 12½% silicon-87½% aluminum, it is preferred to use a melt of 25% silicon-75% aluminum. However, ratios of aluminum-to-silicon of 10:1 and higher may also be used in this process. When the ratio is less than 3:1, efficient reduction is impaired. As the molten alloy is maintained at a low temperature range for a predetermined period of time, it undergoes nucleation and a growth of large crystals of elemental silicon is developed therein. If the temperature of the aluminum-silicon alloy is maintained at 1100–1250° F. (593.5° C.–671° C.), silicon particles of 80–200 mesh are formed within 6 to 48 hours. If the temperature is increased to 1500° F. (815° C.) it is possible to obtain large flat, plate-like hexagonal crystals measuring from one-half to one inch at their widest point. These crystals are separated from the silicon-aluminum melt either by high temperature filtration, high temperature centrifugation by pulling single crystals from the molten alloy or by dissolving the excess aluminum in acid.

The silicon crystals thus formed are further purified by dissolving the adhering aluminum with a mineral acid, examples of which are hydrochloric acid, nitric acid, sulfuric acid, perchloric acid, and the like, followed by desliming, filtering and washing prior to flotation with a reagent, such as hydrofluoric acid or a sodium fluoride-hydrochloric acid mix. A solution made .05 to .1% sodium fluoride and about 1 normal with hydrochloric acid gave flotations comparable to hydrofluoric acid in most cases. The silicon crystals are again filtered and washed and then leached in a 1% sodium hydroxide solution. After being filtered and washed they undergo a second flotation treatment. The silicon may be further purified by the zone-melt process or may undergo further treatment, such as refluxing with boiling hydrochloric acid, then desliming, filtering and washing. This is followed by treatment with a hydrofluoric-sulfuric or hydrofluoric perchloric mix, which assures silicon crystals of the highest purity which can be pulled into single crystals for use in sensitive and extremely critical electronic components. If the size of silicon crystals which are produced is too fine, i.e. from 400 to 600 mesh, their purity after the second flotation step is not as satisfactory as would be desired. It has been noted that the larger the crystals, the larger their surface area and the easier it is to purify them to the desired standard.

When the silicon crystals have been separated from the silicon-aluminum melt, for example, by dissolving the excess aluminum in an acid, such as hydrochloric acid, the crystals must then be removed from the presence of various oxidized aluminous by-products. This is best accomplished by flotation procedures. If the finely divided material is submerged in water, and a few percent of hydrogen fluoride is added thereto, the silicon particles become water-repellent and rise to the surface in the company of gases generated by reaction of the hydrofluoric acid with the metallic materials still present. In a conventional small size flotation cell, it was found that fairly large particles of silicon could be floated and separated from the solution. The addition of foaming agents enhances the separation and, as examples of such agents, are included Dow Foam 250, Aerofroth 25, and the like. The former is a water soluble propylene methylglycol ether produced by The Dow Chemical Co., while the latter is a solution containing 25% phosphorous pentasulfide in cresylic acid produced by the American Cyanamid Co.

It has been noted that the presence of some metallic aluminum favors the flotation process. In the absence of metallic aluminum, additional hydrofluoric acid solution must be added to the melt until a pH of 2 is reached in order to float the silicon crystals. Particles of silicon of greater than 40 mesh size will not rise under the influence of hydrofluoric acid alone, but require conventional flotation equipment and frothing agents, unless a large amount of fine silicon is present therein. With coarse silicon, a relatively long conditioning time, such as 30 minutes, is needed for best results. Before undertaking the flotation operation, it is essential to remove all water-soluble materials, such as aluminum chloride, by thoroughly rinsing the finely divided material.

While some separation of the silicon particles from the oxidized by-products may be effected by electrostatic separation, the larger particles of silicon in the gangue can be separated by gravity separation in a heavy liquid, such as tetrabromoethane cut with isopropyl salicylate to a specific gravity of approximately 2.5.

A general procedure of separation of the silicon particles from the gangue is as follows:

(1) Flotation with frothing agents to recover silicon with some foreign material.

(2) Screening the flotation concentrate to separate plus 40 and minus 40 mesh material.

(3) Flotation of minus 40 mesh material to purify it.

(4) Separation with heavy liquid media to purify the coarse material.

While the following are examples of one embodiment of this invention, it is to be understood that the invention is not to be considered limited to such examples.

EXAMPLE I

Sodium silicate glass was melted in an ordinary glass tank which was maintained at a temperature of 1200–1300° C. The molten glass was fed into a reaction chamber containing excess molten aluminum and maintained at a temperature of 1200° C. Aluminum bar stock having a purity of 99.85% was used and, in the resulting reaction, the aluminum reduced the $SiO_2$ in the glass to Si and was itself oxidized to $Al_2O_3$. As soon as the silicon was formed, it dissolved readily in the excess aluminum to form a silicon-aluminum alloy in the molten state. A quantity of excess aluminum was used calculated to yield a liquid alloy of approximately 75% $Al$–25% Si which is in addition to the theoretical quantity required for the reduction. The atmosphere in the reaction chamber was maintained neutral to slightly reducing by means of selas burners. After feeding the molten alloy into crucibles placed within a holding chamber, the temperature of this chamber was maintained at 700–750° C. During the following 12 hours at this temperature, the alloy underwent nucleation and growth of silicon crystals. Maintenance of the alloy at the temperature of the holding chamber also acted as a fractional crystallization device resulting in very pure crystals.

The pure silicon crystals which formed were separated from the silicon-aluminum melt and the silicon was further purified by dissolving the adhering aluminum and aluminum by-product with dilute hydrochloric acid. After desliming, filtering and washing the crystals they were placed in a flotation chamber having as the principal reagent therein hydrofluoric acid. The crystals were again filtered and washed prior to leaching in a 1% sodium hydroxide solution and then underwent a second flotation treatment. After again filtering and washing the silicon crystals, they were refluxed with concentrated hydrochloric acid for two hours. Subsequent to desliming, filtering and washing the silicon crystals were leached with a hydrofluoric-sulfuric acid mix. The resultant silicon was of the desired purity.

EXAMPLE II

Pure silicon crystals were prepared in the manner described in Example I from very pure sodium silicate glass. As the purifier, 99.99% pure aluminum, obtained from the Kaiser Aluminum Co., was used. The pure silicon crystals thus produced were compared by spectrographic analysis with the pure silicon manufactured and sold by E. I. du Pont de Nemours and Co. under the trademark Du Pont Hyper-Pure, with the following results.

*Table I*

| Impurities | Silicon Sample, Percent | Du Pont Hyper-Pure Silicon Percent |
|---|---|---|
| Al | .081 | .057 |
| B |  | .000008 |
| Ba | .000067 |  |
| Ca |  | .0024 |
| Cr |  | .00075 |
| Cu | .000012 | .0000042 |
| Fe | .000001 |  |
| K | .0012 | .0002 |
| Mg | .000003 | .000033 |
| Mn | .000002 | .000009 |
| Na | .0023 | .00065 |
| Pb |  | .00001 |
| Pt | .00023 |  |
| Sn |  | .000053 |
| Zn |  | .0023 |

The impurity which shows up in the silicon sample as aluminum spectrographically is actually $Al_2O_3$ present in the form of refractory corundum as determined by X-ray. The material in the Du Pont silicon is also corundum and was probably introduced in the crushing of the silicon in a synthetic sapphire mortar.

Silicon samples were also prepared from 12% $B_2O_3$ borosilicate glass and straight soda-lime silica glass following the procedure defined in Example I, and were analyzed qualitatively for 69 elements spectrographically.

A total of nine impurity elements were found in the borosilicate glass sample with boron and aluminum the only impurities present in an amount greater than .010% by weight. The boron was present in the amount somewhere between .10 and 10%.

A total of ten impurity elements were found in the soda-lime-silica sample with only aluminum in amount greater than .010%.

In general, the impurity elements were similar to those checked quantitatively in the sample of Table I except for the boron present in the borosilicate sample.

Having defined the invention what is claimed is:

1. A process for forming pure elemental silicon crystals of from 80–200 mesh size comprising mixing a predetermined amount of molten silicon-containing glass with molten aluminum to form an aluminum-silicon alloy melt consisting essentially of at least three parts by weight of aluminum for each part by weight of silicon, lowering the temperature of said alloy melt to about 1100–1250° F. and maintaining said temperature for a period of from 6 to 48 hours, separating the formed silicon crystals therefrom, treating said crystals with a mineral acid to remove aluminous impurities therefrom, subjecting said crystals to a flotation treatment in an aqueous solution containing a flotation reagent selected from the group consisting of hydrofluoric acid and a sodium fluoride-hydrochloric acid mix, and removing said pure silicon crystals from the flotation solution.

2. A process for forming large, flat, plate-like hexagonal crystals of pure silicon of from one-half to one inch at their widest point comprising mixing a predetermined amount of a molten silicon-containing glass with molten aluminum to form an aluminum-silicon alloy melt having a ratio of aluminum to silicon of from 10:1 to 3:1, lowering the temperature of said melt to 1500° F. and maintaining said temperature for a period of from 6 to 48 hours, separating the formed silicon crystals therefrom, and treating said crystals with a mineral acid to remove aluminous impurities therefrom.

3. A process for forming pure elemental silicon crystals from a boron-free, silicon-containing glass having a melting point below the melting point of silicon comprising melting a predetermined amount of said glass, mixing said molten glass with an excess of pure molten aluminum at a temperature of about 1200° C. to form a silicon-aluminum alloy melt wherein the aluminum to silicon ratio is from 10:1 to 3:1, maintaining said alloy melt at a temperature of 700–750° C. for a period of from 6 to 48 hours, separating the formed silicon crystals therefrom, treating said crystals with a mineral acid to remove aluminous impurities therefrom, subjecting said crystals to a flotation treatment in an aqueous solution containing a flotation reagent selected from the group consisting of hydrofluoric acid and a sodium fluoride-hydrochloric acid mix, and removing the pure silicon crystals of 40 mesh size and smaller from the flotation solution.

4. A process for forming pure elemental silicon crystals from glass of low melting composition selected from the group consisting of sodium silicate glass and soda-lime-silica glass comprising melting a predetermined amount of said glass, mixing said molten glass with an excess of pure molten aluminum at a temperature of about 1200° C. to form a silicon-aluminum alloy melt wherein the ratio of the aluminum to silicon is from 10:1 to 3:1, maintaining the aluminum silicon alloy melt thus formed at a temperature of 700–750° C. for a period of at least 12 hours in a neutral to slightly reducing atmosphere, removing the silicon crystals therefrom of 40 mesh size and smaller, washing said crystals of 40 mesh size and smaller with an inorganic acid to remove aluminum impurities, subjecting said crystals to a flotation treatment in an aqueous solution containing a flotation reagent selected from the group consisting of hydrofluoric acid and a sodium fluoride-hydrochloric acid mix, and removing the pure silicon crystals of 40 mesh size and smaller from the flotation solution.

5. The process as defined in claim 4 wherein the glass is a sodium silicate glass.

6. The process as defined in claim 4 wherein the glass is a soda-lime-silicate.

7. The process as defined in claim 4 wherein said highly purified silicon crystals are further treated with a mineral acid mix.

References Cited in the file of this patent

UNITED STATES PATENTS

| | | |
|---|---|---|
| 2,054,427 | Kirsebom | Sept. 15, 1936 |
| 2,469,418 | Striplin | May 10, 1949 |
| 2,885,364 | Swartz | May 5, 1959 |

FOREIGN PATENTS

| | | |
|---|---|---|
| 18,659 | Great Britain | of 1899 |

OTHER REFERENCES

Mellor: "Inorganic and Theoretical Chemistry," vol. 6, pp. 184, Longmans, Green and Co., London (1925).

Mixter: "American Journal of Science," 4th Series, 1907, vol. 24, p. 130.